Patented Dec. 19, 1933

1,939,676

UNITED STATES PATENT OFFICE 1,939,676

CELLULOSE NITRATE COATING COMPOSITION

George R. Ensminger, New Brunswick, N. J., assignor to E. I. du Pont de Nemours & Company, Wilmington, Del., a corporation of Delaware No Drawing. Application April 9, 1932
Serial No. 604,354

24 Claims. (Cl. 134—79)

This invention relates to cellulose nitrate coating compositions and, more particularly, to durable coating compositions of the "pearl essence" type including a cellulose nitrate compatible metal salt of a half ester of a dicarboxylic acid.

It is known that pleasing surface effects can be obtained by coating surfaces with substantially clear cellulose nitrate lacquers containing pearl essence or equivalent material. Such lacquers are usually applied to a surface previously coated with a pigmented coating composition to give a colored background. As is known to those familiar with the art, pearl essence consists primarily of guanin crystals ($C_6H_5N_5O$) and is obtained from fish scales. Heretofore, the use of pearl essence finishes has been greatly limited because of the extremely poor durability of the cellulose nitrate films containing the pearl essence, particularly on outdoor exposure. The pearl essence does not in itself contribute to any appreciable extent to the poor durability of the film, said poor durability apparently being due to the non-opaqueness of the film which permits rapid deterioration of the cellulose nitrate film by the ultra-violet light in sunlight. Although pearl essence type films are not necessarily clear, and in fact can be more accurately described as translucent, they can not be opaque because an opaque film would destroy the pearl essence effect. A small amount of opaque pigment has been incorporated in pearl essence compositions to improve the durability of the resulting films, but the amount has been insufficient to give a film having good durability on outdoor exposure. The amount of pigment added has not been sufficient to give even an approximately opaque film, nor does the addition of pearl essence in amounts adapted to give a lustrous effect, nor the addition of pearl essence substitutes such as metallic powders, i. e., silver or aluminum powders, inorganic compounds like mercurous chloride, or organic compounds such as oxanilide, give an opaque film.

An object of this invention is to provide coating compositions adapted to give non-opaque films of the pearl essence type having durability on outdoor exposure comparable to that of a normal pigmented cellulose nitrate enamel or lacquer. Other objects of the invention will be apparent from the description hereinafter given.

The above objects are accomplished according to the present invention by the incorporation in cellulose nitrate coating compositions containing pearl essence, or equivalent material, a cellulose nitrate compatible salt of a half ester of a dicarboxylic acid, the metal in said salt being selected from the group consisting of iron, copper, cobalt, nickel, and manganese.

It has been found that the greatly increased durability of the composition depends upon the metal in the metal salt rather than any particular half ester of a dicarboxylic acid and that any half ester of a dicarboxylic acid which gives a metal salt compatible with the cellulose nitrate is suitable. By compatible is meant the property of being retained in a cellulose nitrate film upon drying. The half butyl phthalate has been found particularly suitable due to the great compatibility of the metal salts thereof with cellulose nitrate, although the half phthalate esters of other alcohols, such as ethyl, amyl, propyl, benzyl, or cyclohexyl alcohols, may be mentioned as eminently suitable. Among the dicarboxylic acids other than phthalic acid which are suitable may be mentioned sebacic, succinic, maleic, tartaric, and malic acids.

The metal selected is of great importance in the present invention, inasmuch as some metals do not increase durability of the films at all, while others differ considerably in efficacy. Iron salts have been found to give the greatest improvement in durability, while nickel and copper salts are also excellent for this purpose. Manganese and cobalt salts are not as good as the foregoing salts, but still increase durability appreciably. Tin and zinc salts, although closely related to the above salts, offer no appreciable improvement in durability and are substantially inoperative in the present invention.

The metals found to be operative in the present invention, namely, iron, copper, cobalt, nickel, and manganese, all give colored salts, the color of the butyl phthalate salt of these metals being given below:

Iron butyl phthalate_____Reddish brown
Copper butyl phthalate_____Blue
Cobalt butyl phthalate_____Violet
Nickel butyl phthalate_____Green
Manganese butyl phthalate_____Green Although the coloration caused by these salts in many instances would be objectionable in clear cellulose nitrate films, it is an advantage in pearl essence compositions because colorless pearl essence compositions tend to hide too completely the color of the undercoat to give pleasing effects, whereas the coloration caused by the metal salts offsets this. For example, a small amount of blue pigment is often added to a pearl essence composition to be coated over a blue undercoat but, by the use of copper butyl phthalate in the pearl essence composition, the resulting film is not only radically improved in durability but is sufficiently blue in itself to make the addition of the blue pigment unnecessary.

The following example is given to illustrate a typical cellulose nitrate lacquer embodying the present invention:—

*Example 1*

|                            | Parts |
|----------------------------|-------|
| Cellulose nitrate          | 8     |
| Resin                      | 2     |
| Iron butyl phthalate       | 3     |
| Solvent softener           | 3     |
| Non-solvent softener       | 2     |
| Solvents and diluents      | 82    |
|                            | 100   |

Pearl essence is added to this clear lacquer in an amount depending upon the effect desired. For example, 5 parts of a pearl essence cellulose nitrate paste consisting of 15 parts of guanin crystals, 15 parts of cellulose nitrate, 70 parts of solvents and diluents, to about 95 parts of the lacquer in the example would be usual, although as previously stated, the proportion may be varied at will depending upon the effect desired. Pearl essence is usually sold in a paste such as disclosed above, or as a suspension of guanin crystals in toluol or amyl acetate, both of which forms are suitable for addition to a cellulose nitrate lacquer.

In the above example no attempt has been made to specify particular solvents and diluents, since appropriate solvent mixtures including ethyl alcohol, acetone, ethyl acetate, amyl acetate, et cetera, and the various diluents such as benzene, toluol, xylol, et cetera, will be obvious to those skilled in the art.

Other cellulose derivatives, such as cellulose acetate, may replace the cellulose nitrate entirely or in part in the example, and other cellulose nitrate compatible metal salts of half esters of dicarboxylic acids as heretofore disclosed may replace the iron butyl phthalate entirely or in part. The proportion of metal salt employed may vary between 5–30% by weight of the total film forming ingredients of the composition, that is, the cellulose derivative, the resin, the softeners, the guanin crystals, and the metal salt. It is not practical to use a greater proportion than 30% of the metal salt by weight of the film forming ingredients, due to the brittleness imparted to the film, and lower than 5% of the metal salt by weight of the total film forming ingredients is insufficient to give a film of sufficient durability for outdoor exposure. It is preferred to keep the proportion of metal salt between 15–25% by weight of the total film forming ingredients of the composition, proportions within that range giving particularly satisfactory results.

Although the resin may be excluded from the composition, its inclusion is greatly preferred. Any one of the resins commonly used in cellulose nitrate lacquers is suitable. For example, the various polyhydric alcohol-polybasic acid type resins and various varnish gums or resins such as dammar, mastic soft copals, elemi, rosin, sandarac, shellac, and the like.

The term "pearl essence" as used in the claims is intended to include not only pearl essence but obvious equivalents thereof, such as silver and aluminum powders, mercurous chloride, and oxanilide, substances which are used in place of pearl essence to some extent to obtain lustrous finishes.

Since the metal salts coming within the scope of the present invention tend to increase the brittleness of the film, it is important that they should not be considered as equivalents of the softeners usually employed in cellulose nitrate lacquers, but if anything should be used to replace the resin constituent of the lacquer. The inclusion of a softener or softeners is highly advantageous in securing a lacquer of acceptable flexibility and it is preferred that the combined weight of the softeners, both solvent and non-solvent, be at least equal to 50% by weight of the cellulose nitrate in the composition. As is usual in making up cellulose nitrate lacquers, it is preferred to use both a solvent softener, for example, dibutyl phthalate, diethyl phthalate, tricresyl phosphate, ethoxyethyl phthalate, and the like, and a non-solvent softener such as castor oil, coconut oil, cottonseed oil, and other common non-drying oils used for this purpose. It will be appreciated that when using cellulose acetate, the known softeners for cellulose acetate should be used rather than cellulose nitrate softeners.

Due to the increased durability of films made from pearl essence compositions including the herein disclosed metal salts, there is no necessity of adding small amounts of pigments to the composition to improve the durability. However, the addition of a small amount of pigment is not excluded and, in certain cases, may be advantageous in obtaining a desired colored effect.

The compositions of the present invention may be produced according to standard practices well known to those skilled in the art. The simplest method of procedure is to dissolve the cellulose ester in suitable solvents and to then add the other ingredients, such as the resin, softeners, other solvents and diluents with sufficient mixing to give a uniform dispersion. The pearl essence may be added with agitation to the clear dispersion thus formed. With proper thinning, the compositions may then be applied by means of a spray gun or, if desired, by brushing, roller coating, dipping, or other methods known in the finishing art.

The pearl essence compositions herein disclosed may be applied over colored ground coats or directly to various surfaces such as metal, wood, and the like. Due to the pleasing effect obtained, it is more usual to apply the composition over a colored background.

An advantage of the present invention resides in the phenomenal improvement in durability of films made from pearl essence compositions according to the present invention as compared to films made from pearl essence compositions heretofore known. By the use of the present invention, a pearl essence finish can be produced with an outdoor durability of as much as ten times that of the commonly used clear cellulose nitrate vehicle containing pearl essence when exposed under identical conditions. Such a radical improvement in durability has tremendously widened the field of use of these compositions since the durability has been sufficiently increased to make the use of the finishes entirely practical for automobiles, boats, and the like, as well as all surfaces subject to outdoor exposure. Heretofore the durability of pearly essence finishes has been so extremely poor that their use on surfaces subject to outdoor exposure was impractical, although frequently attempted due to the very pleasing and novel effects obtained. A further advantage of the invention is that, due to the color inherent to the metal salts herein disclosed, the need of securing color in the pearl essence film by the addition of pigments has been overcome. This not only effects a saving in trouble in compounding the pearl essence composition, but also is noticeable in producing a more lustrous effect on the finished surface, since the presence of pigment in the pearl essence film has a tendency to dull the film and reduce the lustrous effect. The color in the metal salts is transparent and therefore does not have any tendency to destroy the lustrous appearance in the finish.

As many apparently widely different embodiments of this invention may be made without departing from the spirit and scope thereof, it is to be understood that the invention is not limited to the specific embodiments thereof except as defined in the appended claims.

I claim:

1. A coating composition adapted to give non-opaque films comprising cellulose nitrate, pearl essence, and a cellulose nitrate compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese.

2. A coating composition adapted to give non-opaque films comprising cellulose nitrate, pearl essence, a softener, and a cellulose nitrate compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese, and said salt amounting to 5-30% by weight of the total film forming ingredients in said composition.

3. A coating composition adapted to give non-opaque films comprising cellulose nitrate, pearl essence, a softener, a resin, and a cellulose nitrate compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese, and said salt amounting to 5-30% by weight of the total film forming ingredients in said composition.

4. A coating composition adapted to give non-opaque films comprising cellulose nitrate, pearl essence, at least 50% by weight of the cellulose nitrate of a softener, a resin, and a cellulose nitrate compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese, and said salt amounting to 5-30% by weight of the total film forming ingredients in said composition.

5. A coating composition adapted to give non-opaque films comprising cellulose nitrate, pearl essence, a solvent softener, a non-solvent softener, the combined weight of said solvent softener and said non-solvent softener being equal to at least 50% by weight of the cellulose nitrate, a resin, and a cellulose nitrate compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese, and said salt amounting to 5-30% by weight of the total film forming ingredients in said composition.

6. A coating composition adapted to give non-opaque films comprising cellulose nitrate, pearl essence, a softener, and a cellulose nitrate compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese, and said salt amounting to 15-25% by weight of the total film forming ingredients in said composition.

7. A coating composition adapted to give non-opaque films comprising cellulose nitrate, pearl essence, a softener, a resin, and a cellulose nitrate compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese, and said salt amounting to 15-25% by weight of the total film forming ingredients in said composition.

8. A coating composition adapted to give non-opaque films comprising cellulose nitrate, pearl essence, at least 50% by weight of the cellulose nitrate of a softener, a resin, and a cellulose nitrate compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese, and said salt amounting to 15-25% by weight of the total film forming ingredients in said composition.

9. A coating composition adapted to give non-opaque films comprising cellulose nitrate, pearl essence, a solvent softener, a non-solvent softener, the combined weight of said solvent softener and said non-solvent softener being equal to at least 50% by weight of the cellulose nitrate, a resin, and a cellulose nitrate compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese, and said salt amounting to 15-25% by weight of the total film forming ingredients in said composition.

10. A coating composition adapted to give non-opaque films comprising cellulose nitrate, pearl essence, and a cellulose nitrate compatible salt of a half ester of phthalic acid, the metal in said salt being selected from the group consisting of iron, copper, cobalt, nickel, and manganese.

11. A coating composition adapted to give non-opaque films comprising cellulose nitrate, pearl essence, a softener, a resin, and a cellulose nitrate compatible salt of a half ester of phthalic acid, the metal in said salt being selected from the group consisting of iron, copper, cobalt, nickel, and manganese, and said salt amounting to 5-30% by weight of the total film forming ingredients in said composition.

12. A coating composition adapted to give non-opaque films comprising cellulose nitrate, pearl essence, a softener, a resin, and a cellulose nitrate compatible salt of a half ester of phthalic acid, the metal in said salt being selected from the group consisting of iron, copper, cobalt, nickel and manganese, and said salt amounting to 15-25% by weight of the total film forming ingredients in said composition.

13. A coating composition adapted to give non-opaque films comprising cellulose nitrate, pearl essence, and a cellulose nitrate compatible salt of the half butyl ester of phthalic acid, the metal in said salt being selected from the group consisting of iron, copper, cobalt, nickel, and manganese.

14. A coating composition adapted to give non-opaque films comprising cellulose nitrate, pearl essence, a softener, a resin, and a cellulose nitrate compatible salt of the half butyl ester of phthalic acid, the metal in said salt being selected from the group consisting of iron, copper, cobalt, nickel, and manganese, and said salt amounting to 5-30% by weight of the total film forming ingredients in said composition.

15. A coating composition adapted to give non-opaque films comprising cellulose nitrate, pearl essence, a softener, a resin, and a cellulose nitrate compatible salt of the half butyl ester of phthalic acid, the metal in said salt being selected from the group consisting of iron, copper, cobalt, nickel and manganese and said salt amounting to 15-25% by weight of the total film forming ingredients in said composition.

16. A coating composition adapted to give non-opaque films comprising cellulose nitrate, pearl essence, and iron butyl phthalate.

17. A coating composition adapted to give non-opaque films comprising cellulose nitrate, pearl essence, a softener, a resin, and iron butyl phthalate, said last ingredient amounting to 5-30% by weight of the total film forming ingredients in said composition.

18. A coating composition adapted to give non-opaque films comprising cellulose nitrate, pearl essence, a softener, a resin, and iron butyl phthalate, said last ingredient amounting to 15-25% by weight of the total film forming ingredients in said composition.

19. A coating composition adapted to give non-opaque films comprising a cellulose ester, pearl essence, and a cellulose ester compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese.

20. A coating composition adapted to give non-opaque films comprising cellulose acetate, pearl essence, and a cellulose acetate compatible salt of a half ester of a dicarboxylic acid from the group consisting of phthalic, sebacic, succinic, maleic, tartaric, and malic, the metal in said salt being selected from the group consisting of iron, copper, cobalt, nickel, and manganese.

21. A coating composition adapted to give non-opaque films comprising cellulose nitrate, pearl essence, and a cellulose nitrate compatible salt of a half ester of a dicarboxylic acid from the group consisting of phthalic, sebacic, succinic, maleic, tartaric, and malic, the metal in said salt being iron.

22. A coating composition adapted to give non-opaque films comprising cellulose nitrate, pearl essence, and a cellulose nitrate compatible salt of a half ester of a dicarboxylic acid from the group consisting of phthalic, sebacic, succinic, maleic, tartaric, and malic, the metal in said salt being copper.

23. A coating composition adapted to give non-opaque films comprising cellulose nitrate, pearl essence, a softener, a resin, and a cellulose nitrate compatible salt of a half ester of a dicarboxylic acid from the group consisting of phthalic, sebacic, succinic, maleic, tartaric, and malic, the metal in said salt being iron, said salt amounting to 5-30% by weight of the total film forming ingredients in said composition.

24. A coating composition adapted to give non-opaque films comprising cellulose nitrate, pearl essence, a softener, a resin, and a cellulose nitrate compatible salt of a half ester of a dicarboxylic acid from the group consisting of phthalic, sebacic, succinic, maleic, tartaric, and malic, the metal in said salt being copper, said salt amounting to 5-30% by weight of the total film forming ingredients in said composition.

GEORGE R. ENSMINGER.